United States Patent Office 3,327,601
Patented June 27, 1967

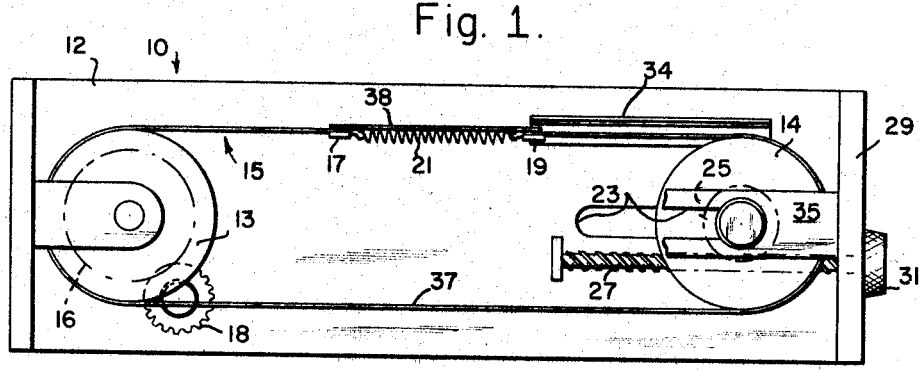
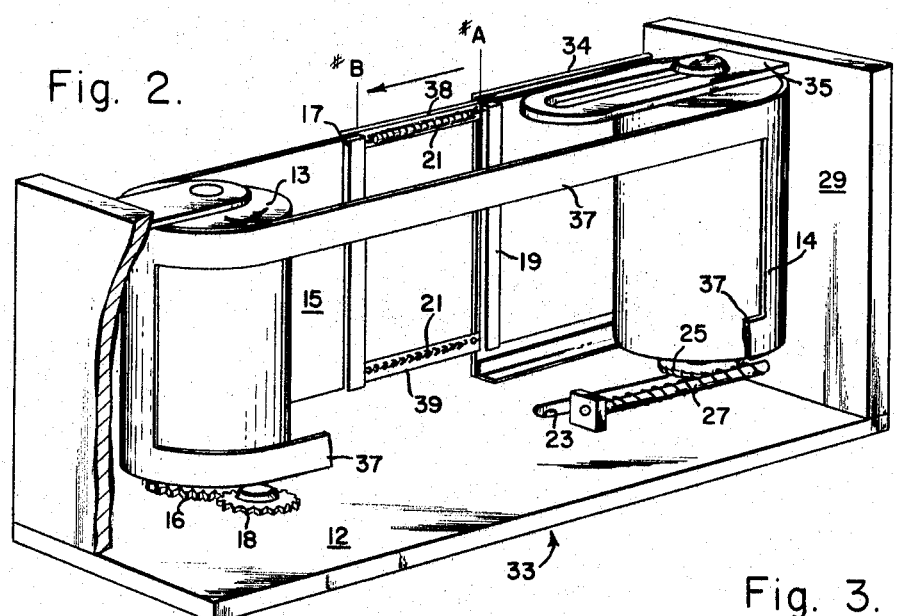
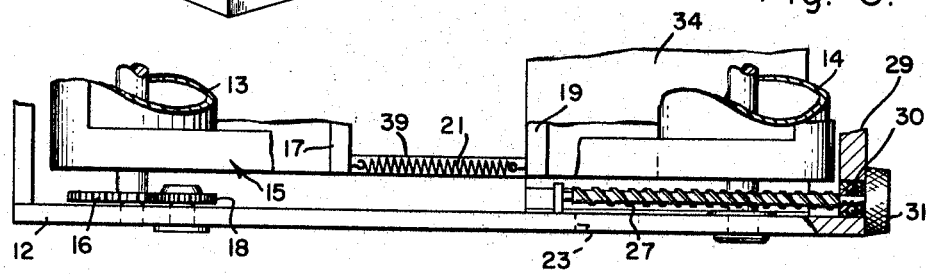
Edward V. Fish,
INVENTOR.
BY.
Golove & Kleinberg,
ATTORNEYS.

3,327,601
FOCAL PLANE SHUTTER
Edward Vail Fish, Los Angeles County, Calif., assignor to Hycon Mfg. Company, Monrovia, Calif.
Filed Jan. 28, 1965, Ser. No. 428,734
6 Claims. (Cl. 95—57)

This invention pertains to a shutter device and, more particularly, to a device which may be used as a focal plane shutter in a camera.

Many situations require the accurate control of the passage of an amount light or other wave transmission. The control of visible light in the camera is the most well known of these uses while other modern uses are becoming more important. For example, the control of X-rays, waves impinging on sensor devices such as total transistors, and like arrangements do or may require accurate control. Shutters were devised long ago to control the amount of light passed to form a photographic image by varying the cross section of the opening and the time during which passage of light is allowed.

Various types of shutters are commonly used in modern cameras. Shutter classifications are many; however, those describing the position of the shutter as "between-the-lens" and "focal plane" have become most common. Each type offers certain advantages. For example, a "between-the-lens" shutter probably subjects the pictures to less distortion; but it also requires substantial mechanism with each lens and is therefore infrequently used with cameras having removable and interchangeable lenses. A focal plane shutter, on the other hand, is more subject to distortion and offers substantial timing difficulties but does not require the cumbersome apparatus in each lens with which a camera is used, and is therefore much more economical.

Essentially, a focal plane shutter includes a strip of material which is placed over the photographic material which is to be exposed. The shutter has a hole of precise size cut in it through which the exposure is to be made. Means are provided for pulling the strip of material across the photographic surface to expose the film for a particular precise period of time depending upon the amount of light is the size of the opening. A number of arrangements have been provided for varying the speed at which the opening is pulled across the film plane, for varying the size of the opening, and for otherwise varying the amount of light reaching the film.

All of the methods known to the prior art, save those essentially impossible to accomplish within a small portable camera, provide equipmest which lose its accuracy after a period of time. For example, most focal plane cameras must be adjusted after a period of one or two years. At this time, it is often found that shutter speeds vary from 20 to 100% about the desired figures. These inaccuracies are caused by wear on tension springs, wear on the gearing mechanisms, and by other internal factors.

In any case, the advent of modern color films has made the timing criteria for modern cameras much more critical. For example, black and white films offer as many as seven "stops" in latitude and color film may be improperly exposed by less than a one "stop" error.

Quite obviously, attempts have been made to overcome the timing problems, and in general, these attempts have involved equipment complication. As cameras have become more accurate, they have also become larger and less portable. An increase in expenses have also been attendent on an increase on photographic accuracy. To date, the problem of accurately exposing film with an old and unadjusted camera remains.

To overcome these difficulties, a new focal plane shutter has been devised. The shutter of the present invention uses a piece of material having a single slit of controllable width. The width is controlled by the positioning of a pair of rollers which when placed farther apart expands the slit and when placed closer together decreases the width of the slit. The rollers also impel the slit over the film to accomplish the exposure. The variation in width with roller movement is aided by an elastic member which holds the two sides together and varies with the movement of the roller. It may be shown that the roller need move only half the distance by which the slit width is increased so that the distance of movement may be quite small.

The mechanism for accomplishment may be made quite simple. All in all, the mechanism is such as reduces the size and complication of the shutter and the camera with which it is associated. Furthermore, in contrast to prior art shutters, a change in the tension of the elastic member over great range will have no effect on the timing of the shutter.

It is therefore a primary object of this invention to improve the accuracy of focal plane shutters.

Another object of this invention is to reduce the effect of wear on the accuracy of a focal plane shutter.

An additional object of this invention is to reduce the size of the focal plane shutters and the equipment associated with such shutters.

Another object is to simplify and reduce the cost of focal plane shutters used in modern day cameras.

Yet another object of this invention is to provide shutters by which more accurate photographic exposures may be made.

Another object of this invention is to provide shutter arrangements which are easily made without the complication of known arrangements.

These and other features, advantages, and objects of the invention will be better understood from the specific description which follows when taken together with the attached drawings. In the drawings, like components have been identified and the like manner are from figured figures, wherever the analogy was appropriate.

FIG. 1 is a plan view of a particular arrangement in accordance with the invention;

FIG. 2 is a perspective view of the arrangement constructed in accordance with the invention, more particularly showing the open area for exposure and the mechanical linkage used for moving the particular roller to vary the widths of the shutter opening; and FIG. 3 is a partial elevation view of the device.

FIG. 1 illustrates a shutter arrangement 10. The arrangement 10 has a base piece 12 which may be constructed from any material which might be used for the base in a particular camera such as plastic or light metal. The base piece 12 supports the first roller 13 by a conventional bearing arrangement (not shown), and by a similar bearing arrangement in the second roller 14. The rollers 13 and 14 have smooth outer surfaces constructed of a material such as to provide an appropriate frictional surface for advancing a curtain 15. The curtain 15 has end pieces 17 and 19, better illustrated in FIG. 2, which are joined together by tension member 21, shown here as a spring. It will be quite obvious that the distance separating the end pieces 17 and 19 depends on the distance by which the axes of the rollers 13 and 14 are separated.

The lateral distance between the end pieces 17 and 19 may be varied by moving the rollers apart or together. To this end, the second roller 14 is mounted in a slot 23 in the base piece 12 in a manner such as to allow the axis of the second roller 14 to move in a direction orthogonal to the axis and in the plane defined by the long dimension of the slot 23 and the axis. Lateral movement of the roller 14, as defined above, is accomplished by a worm gear 27 which turns on a bevel gear 25 mounted along the axis of the roller 14. The worm gear 27 is mounted to rotate in a bearing 30 upon rotation of a knob 31. The knob 31 and the gear 27 are held by the bearing 30 in a fixed relationship to an end bracket 29 which can advantageously be mounted to the base piece 12.

Upon rotating the worm gear 27 in the first direction, the second roller 14 will be caused to move away from the first roller 13, thereby widening the slit between the end pieces 17 and 19. Moving the gear 27 in the opposite direction, the distance between the rollers 14, 13 will be decreased, thereby reducing the gap between end pieces 17, 19. The slack between those members will constantly be taken up by the tension member 21. A motor or other driving means 18 (shown here only as an output gear) may drive the first roller 13 through a drive gear 16.

Thus the adjustment of the knob 31 will set the distance between the end pieces 17, 19, and thus the width of the opening is controlled. The motor 18 is then operated to pass the opening by the film plate to be exposed.

Certain items in the operation of the arrangement 10 are especially important. For example, the tension member 21 must be adapted to provide sufficient force upon each of the end pieces 17, 19 so that the curtain 15 will remain taut during the traversal of the opening past the film plane. The computations for determining the spring tension of the tension member 21 are set out below with respect to a particular embodiment of the invention.

The materials for the curtain 15 and the rollers 13, 14 must be such as to provide appropriate friction so that slippage between the curtain 15 and the rollers will not take place with consequent loss of speed. This has been accomplished in a particular embodiment as outlined above.

In addition, the driving means 18 which drive the first roller 13 or other means for furnishing rotational power to the roller 13, must be adapted to move the opening between the end pieces 17 and 19 past the film plane at a sufficent rate. To accomplish this, the driving means 18 must be so chosen as to have a particular start-up time of minimal duration and the force (torque) and mass of the rollers 13, 14, must be so chosen as to overcome the inertia problem. All of these items are more particularly explained below with respect to the specific embodiment herein discussed.

The arrangement 10 show in FIG. 1 is obviously illustrative of the principles of the invention. The arrangement shown in FIG. 2 is more likely to be used as an actual shutter. The arrangement 33 of FIG. 2 has a base plate 12 upon which are mounted two rollers 13, 14. The curtain 15 is divided at end pieces 17, 19, as above discussed, and is joined together around the rollers by a pair of bands 37. The bands 37 may be of identical material to that of the curtain 15 and are so chosen to provide appropriate resistive properties with the surfaces of the rollers 13, 14 to avoid problems of slippage and curtain inertia.

The end pieces 17, 19 are joined by elastic members 38, 39 which may be of a material of linear or non-linear elastic properties. Materials such as this have elastic properties such that a band may be stretched to approximately twice its normal length yet it will regain its former length, immediately. More substantially, no problem of wear is presented. The distances between the positions marked A and B defines the width of the opening in the curtain 15. In the particular embodiment shown, the first roller 13 rotates in a counterclockwise sense to pull the opening across the film plane.

Even though not specifically illustrated, one particularly advantageous arrangement utilizes a motor in the form of first roller 13 having an appropriate outer surface for carrying the curtain 15. The motor is so wound as to rotate upon its axis, which is fixed to the base 12. The axis of course may be fixed to the upper member body or other arrangement with which it is associated. The magnitude of the volume provided for the roller 13 is especially advantageous in the supplying of sufficient torque for overcoming inertia problems with the curtain 15 and the second roller 14.

It should be noted that a second curtain 34 is illustrated behind a portion of the curtain 15. This curtain 34 is provided to cover the film plane in a normal camera of the focal plane variety after the opening between the end pieces 17 and 19 has passed the film plane. Essentially, it remains in position over the film during the time that the opening is retracted to its original position.

In the embodiment shown in FIG. 2, the roller 13 may be rotated in the direction opposite to that shown in order to place the opening back in its original position. On the other hand, it may be desirable, and more useful in a particular arrangement, to cause the curtain to completely rotate around, in the counterclockwise direction, to its original position. This would allow for an almost completely automatic camera, where all that would be necessary would be actuation of the release button.

In such a situation, the extra, second curtain 34 would be arranged to cover the film plane until the openings between bands 37 have passed. Arrangement for accomplishing the movement of the shutter arrangement 33 with the curtain 15 are well known in the art. All of the modern focal plane shutters include such an extra curtain. In most shutters (and in the counterclockwise rotation followed by a clockwise rotation operation), the shutters are released on the re-cocking of the mechanism of the main shutter.

The second roller 14 illustrated in FIG. 2 is moved along the adjustment path by the actual movement of the end bracket 29. The end bracket 29 has a pair of parallel arms 35, 36, which protrude therefrom and to hold the roller 14 for rotation. The mechanical linkage between the end bracket 29 and base piece 12, such as that shown in FIG. 1, or other well known means, would allow such movement. The arrangement shown in FIG. 2 for moving the second roller 14, would obviously provide for more accurate positioning of the second roller 14.

The materials of which the two curtains 14, 34, are constructed, the materials used in the various gearing mechanisms, other materials used in the shutter other than those used in the tension member 21 and the elestic member 38, 39, are all well knonw in the art. Quite obviously, various and sundry methods of providing elastic or retaining members such as tension member 21 would be feasible in particular embodiments. It is of a special note that the second roller 14 need move only one-half of the distance by which the slit between end pieces 17, 19 is widened. This allows the shutter mechanism to fit easily within the confines of the smallest of present cameras. In fact it allows a substantial reduction in size over that of present cameras.

In a particular arrangement in accordance with the invention, a motor Model Number 368 manufactured by Printed Motors, Inc., having rated voltage of 12 volts D.C. and a rated current of 7 amperes is utilized. The members 17 and 19 each weighed 0.02 pound. Rollers of 0.05 pound weight were used which had a moment of inertia of approximately $5 \times 10^{-4}$ inch-ounce-seconds$^2$. The rollers had a radius of 0.5 inch and were coated with a material having a friction coefficient of approximately 2.0. The curtain weight was 0.03 pound.

A supply voltage of 14 volts furnished a current of less than 10 amps. to provide a desired speed of 80 inches per second. The curtain 15 was accelerated at a rate of 1440 inches per second$^2$ and took 65 milliseconds to reach the speed of 80 inches per second. An interval of 92 milliseconds was selected as a time to enter the exposure position. In the particular embodiment, the absolute minimum spring tension for preventing changes in the slit width due to internal forces and roller friction was 4.4 ounces. If the spring tension is selected to be substantially greater than the minimum amount however, the change of the spring or tension member 21 will have no effect on the width of the slit provided between the end pieces 17 and 19 or upon the timing of the system. This is true because at the minimum spring tension, the system, will accelerate and at a constant velocity and will have tension in the elastic member equal to or greater than the tension or force, across the slit, which is generated by acceleration and friction torques. Thus, the elasticity of the tension member 21 may vary substantially, as much as 50, 60 or even 70% without affecting the timing values.

As pointed out above, other arrangements may be readily conceived by those skilled in the arts once instructed in the principles of the invention. More particularly, the tension member 21 may be varied, the curtain shape may be varied, the means for accomplishing the movement of the roller 14 may be varied, both rollers may be made to move, means for advancing the curtain, other than friction means (sprocket means, for example), may be utilized, all without departing from the spirit and scope of the invention. To this end, the appended claims have been chosen to define the invention.

What is claimed as new is:

1. A shutter to be removably interposed in the path of incident radiation comprising:
    a first and a second roller having axes positioned in parallel to one another;
    a curtain member positioned to move upon said first and second rollers upon the rotation thereof;
    elastic means wholly between the ends of said curtain member for holding opposite ends of said curtain member together in a taut condition to define an exposure slit therebetween; and
    means for moving at least one of said rollers in a direction orthogonal to its axis to increase and reduce the distance between the opposite ends of said curtain member, thereby varying the size of the exposure slit.

2. A shutter comprising:
    a motor;
    a first roller actuated to rotate by said motor;
    a second roller;
    means for moving said rollers away from and toward each other; and
    curtain means associated with both of said rollers for traversing the area therebetween with their associated rotation, said curtain means including first and second end pieces adjacent one another, whereby rotation of said rollers operate the shutter and relative translation of said rollers varies the shutter opening and elastic means wholly between said first and second end pieces for joining said first and second end pieces to one another to hold said curtain taut on said rollers;
    the space between said end pieces defining the shutter opening.

3. A shutter as claimed in claim 2 wherein said means for moving one of said rollers comprises a bevel gear associated with said roller, and a worm gear for rotating said bevel gear.

4. A shutter as claimed in claim 2 in which said elastic member includes at least a pair of parallel associated members having equal elastic properties, arranged between said two end pieces of said curtain means.

5. A shutter as in claim 4 further comprising a secondary shutter arranged to move with said primary shutter to cover a film after exposure by said primary shutter.

6. In a camera, a focal plane shutter having an aperture to be removably interposed in the path of incident radiation comprising:
    a first and a second roller having axes positioned in parallel to one another, and defining a plane parallel to the focal plane;
    a curtain member mounted about said first and second rollers and adapted to move upon the rotation of said rollers;
    elastic means located wholly between the opposite ends of said curtain member for holding said opposite ends together in a taut condition to define an exposure aperture therebetween; and
    means for moving at least one of said rollers laterally in a direction orthogonal to its axis in said plane parallel to said focal plane to increase and reduce the distance between the opposite ends of said curtain member, thereby varying the size of the exposure aperture, whereby translation of one of said rollers varies the aperture width, and rotation of said rollers moves the aperture across the focal plane for admitting incident radiation thereto.

References Cited

UNITED STATES PATENTS 2,315,279   3/1943   Simmon _____ 95—57
3,179,029   4/1965   Vinten _____ 95—57

JOHN M. HORAN, *Primary Examiner.*